(12) United States Patent
Ciurea et al.

(10) Patent No.: US 8,144,985 B2
(45) Date of Patent: Mar. 27, 2012

(54) METHOD OF HIGH DYNAMIC RANGE COMPRESSION WITH DETAIL PRESERVATION AND NOISE CONSTRAINTS

(75) Inventors: Florian Ciurea, San Jose, CA (US); Alexander Berestov, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1130 days.

(21) Appl. No.: 12/004,928

(22) Filed: Dec. 21, 2007

(65) Prior Publication Data

US 2009/0161953 A1    Jun. 25, 2009

(51) Int. Cl.
*G06K 9/00* (2006.01)
*G06K 9/40* (2006.01)
*G03F 3/08* (2006.01)

(52) U.S. Cl. .......... 382/168; 382/274; 358/520
(58) Field of Classification Search ........... 382/168, 382/274; 358/520
See application file for complete search history.

(56) References Cited

U.S. PATENT DOCUMENTS

| | | | | |
|---|---|---|---|---|
| 5,012,333 | A * | 4/1991 | Lee et al. | 358/520 |
| 5,294,989 | A | 3/1994 | Moore et al. | 348/241 |
| 5,426,517 | A | 6/1995 | Schwartz | 358/520 |
| 6,148,103 | A * | 11/2000 | Nenonen | 382/169 |
| 6,198,845 | B1 | 3/2001 | Tse et al. | 382/169 |
| 6,795,113 | B1 | 9/2004 | Jackson et al. | 348/207 |
| 6,826,304 | B2 | 11/2004 | Levy et al. | 382/167 |
| 6,987,881 | B2 | 1/2006 | Nakajima et al. | 382/173 |
| 7,046,397 | B2 | 5/2006 | Loce et al. | 358/1.9 |
| 7,146,059 | B1 | 12/2006 | Durand et al. | |
| 7,885,462 | B2 * | 2/2011 | Paik | 382/168 |
| 2003/0039401 | A1 | 2/2003 | Gallagher et al. | |
| 2003/0152283 | A1 * | 8/2003 | Moriwaki | 382/274 |
| 2003/0161549 | A1 * | 8/2003 | Lei et al. | 382/274 |
| 2003/0190090 | A1 | 10/2003 | Breeman et al. | |

(Continued)

FOREIGN PATENT DOCUMENTS

EP    0501728 B1    4/1998

(Continued)

OTHER PUBLICATIONS

"Adaptive Histogram Equalization Using Variable Regions," Vossepoel, A.M.; Stoel, B.C.; Meershoek, A.P.; 9th International Conference on Pattern Recognition, 1988, pp. 351-353 vol. 1.*

(Continued)

*Primary Examiner* — Wenpeng Chen
(74) *Attorney, Agent, or Firm* — Haverstock & Owens LLP

(57) ABSTRACT

A method for high dynamic range compression uses a modified cumulative histogram as a compression curve. This curve is computed from the cumulative histogram of the image with constraints that the local derivative on the curve does not exceed a certain limit. The limit is fixed along the curve or the limit is variable, taking into account noise characteristics at various pixel values. To provide appropriate detail preservation, a smoothing filter is used to separate the image into an illumination image, referred to as a base image, and a detail image, and the compression curve is applied to the base image only. The compression method provides high dynamic range compression of the image while preserving the global contrast perception. Conventional global algorithms for high dynamic range compression are not capable of achieving this result. The proposed high dynamic range compression method also minimizes noise amplification while lightening the dark areas during image compression.

23 Claims, 13 Drawing Sheets

U.S. PATENT DOCUMENTS

| | | | |
|---|---|---|---|
| 2003/0202693 A1* | 10/2003 | Nakajima et al. | 382/170 |
| 2003/0228064 A1 | 12/2003 | Gindele et al. | |
| 2003/0235343 A1* | 12/2003 | Kagaya | 382/274 |
| 2004/0071363 A1 | 4/2004 | Kouri et al. | |
| 2006/0204124 A1* | 9/2006 | Aihara | 382/274 |
| 2007/0040914 A1* | 2/2007 | Katagiri et al. | 348/221.1 |
| 2007/0104387 A1* | 5/2007 | Han et al. | 382/271 |
| 2009/0021648 A1* | 1/2009 | Shin et al. | 348/672 |

FOREIGN PATENT DOCUMENTS

| | | | |
|---|---|---|---|
| JP | 07249101 A | * | 9/1995 |

OTHER PUBLICATIONS

A Visibility Matching Tone Reproduction Operator for High Dynamic Range Scenes, Larson et al, IEEE Transactions on Visualization and Computer Graphics, vol. 3, No. 4, Oct.-Dec. 1997, pp. 291-306.*

Gregory Ward Larson, "A Visibility Matching Tone Reproduction Operator for High Dynamic Range Scenes", Jan. 15, 1997, pp. 1-35, Copyright 1997 Regents of the University of California subject to the approval of the Department of Energy.

Jack Tumblin and Greg Turk, "LCIS: A Boundary Hierarchy For Detail-Preserving Contrast Reduction", pp. 1-8, Georgia Institute of Technology.

Pizer et al., "Adaptive Histogram Equalization and Its Variations," Computer Vision, Graphics, and Image Processing, vol. 39, pp. 355-368 (1987).

Abdullah-Al-Wadud et al., "A Dynamic Histogram Equalization for Image Contrast Enhancement," IEEE Transactions on Consumer Electronics, vol. 53, No. 2., May 1, 2007, pp. 593-600.

Aghdasi, Farzin et al., Reduction of Boundary Artifacts in Image Restoration, IEE Transactions on Image Processing, vol. 3, No. 4, Apr. 1, 1996, pp. 611-618.

* cited by examiner

METHOD OF HIGH DYNAMIC RANGE COMPRESSION WITH DETAIL PRESERVATION AND NOISE CONSTRAINTS

FIELD OF THE INVENTION

The present invention relates to the field of imaging. More particularly, the present invention relates to a method of high dynamic range compression with detail preservation and noise constraints.

BACKGROUND OF THE INVENTION

Dynamic range is defined as the ratio of the brightest to the darkest intensity level that can be represented by a medium, device or format. Traditionally, camera film is able to capture a higher range of intensity than can be reproduced in print and on traditional displays. Advances in sensor technology have lead to imaging devices that have a higher dynamic range than that of output devices such as printers or displays.

High dynamic range compression refers to a technique of reducing the dynamic range of an image to make it more appropriate to be displayed on a certain output device. An objective when performing high dynamic range compression is to balance the bright and dark areas of the image so as to improve the contrast and maintain the detail of the original image. Current methods for high dynamic range compression can be classified broadly as global or local methods. Global methods apply a certain compression curve to all the pixels within the image, regardless of their spatial position in the image. Local methods apply different transformations to pixels in different positions within the image. Global methods have the advantage of being fast but less flexible, and may not provide appropriate detail preservation. Local methods are more flexible and can achieve a greater dynamic range compression at the expense of higher computation time and possibly image artifacts.

During the high dynamic range compression process, certain areas of the image are brightened, while other areas may be slightly darkened. Generally, lightening an area comes at the expense of increasing visible noise in the image.

An image histogram defines a pixel distribution in terms of light intensity of each pixel. In other words, for a range of intensities, the histogram represents a count of the number of pixels in the image whose intensity falls within the specified range. Histogram equalization is a technique widely used in image processing for increasing local contrast in an image. Through this adjustment, the intensities are better distributed on the histogram. This allows for areas of lower local contrast to gain a higher contrast without affecting the global contrast of the image.

A cumulative histogram is computed from a corresponding histogram by cumulatively adding the pixel distributions for each intensity. For example, at a given intensity, the corresponding pixel distribution on the cumulative histogram curve is the total of all pixels with an intensity equal to or less than the given intensity. In this manner, the cumulative histogram curve is a monotonically increasing function, that is the total pixel count increases with increasing intensity.

The cumulative histogram is the global function that corresponds to performing histogram equalization. In general, a cumulative histogram plots input pixel intensity values on the x-axis versus output pixel intensity values on the y-axis. The cumulative histogram provides a transformation of each pixel from the input pixel intensity value to the output pixel intensity value. The cumulative histogram as an input-output function is applied to each pixel in the image, thereby equalizing the distribution of pixels by intensity within the image. This generates a new image with a more uniformly distributed range of intensities. Histogram equalization provides a method of balancing contrast within an image. However, using the histogram equalization technique as-is for the purpose of high dynamic range compression suffers from at least two significant drawbacks. First, for most natural images, performing a histogram equalization results in an image having excessive contrast and an unnatural appearance. Second, using the cumulative histogram as a global function for high dynamic range compression implies applying the same fiction to all pixels within the image and therefore does not always provide appropriate detail preservation.

The first drawback has been addressed by G. W. Larson, H. Rusmeier and C. Piatko in the paper titled "A Visibility Matching Tone Reproduction Operator for High Dynamic Range Scenes." In this paper, the authors first propose using a modified cumulative histogram as a global compression function for the purpose of high dynamic range compression. The modification consists of limiting the slope of the cumulative histogram curve in order to prevent issues of excessive contrast.

SUMMARY OF THE INVENTION

A method for high dynamic range compression uses a modified cumulative histogram as a compression curve. This curve is computed from the cumulative histogram of the image with constraints that the local derivative on the curve does not exceed a certain limit. The limit is fixed along the curve or the limit is variable, taking into account noise characteristics at various pixel values. To provide appropriate detail preservation, a smoothing filter is used to separate the image into an illumination image, referred to as a base image, and a detail image. The compression curve is applied to the base image only. The compression method provides high dynamic range compression of the image while preserving the global contrast perception. Conventional algorithms based on global compression tone-mapping functions are not capable of achieving this result. The compression method also minimizes noise amplification while lightening the dark areas during image compression.

In one aspect, a method of high dynamic range compression image is disclosed. The method includes separating the image into a base image and a detail image, wherein the base image includes illumination information of the image, determining a base image histogram corresponding to the base image, wherein the base image histogram defines an illumination distribution of the base image, filtering the base image histogram according to a trimming function, thereby generating a base image trimmed histogram, calculating a base image cumulative histogram corresponding to the base image trimmed histogram, compressing the base image according to the base image cumulative histogram, thereby generating a compressed base image, and combining the compressed base image and the detailed image, thereby forming a compressed image. The method can also include determining a noise distribution of the base image. The trimming function can be defined by the noise distribution of the base image. The trimming function can attenuate the base image histogram according to a maximum value for the pixel distribution at each intensity level. The image can be separated using a blurring filter. The blurring filter can be a Gaussian filter. The blurring filter can be an edge-preserving filter such as a bilateral filter. The trimming function can be determined such that a derivative of the base image cumulative histogram resulting from the trimming function does not exceed a predetermined value. The trimming function can define a different maximum pixel distribution for each illumination value. The image can be a grayscale image. If the image is a color RGB image, the method can be applied to each of the R, G, and B channels independently. If the image is a color RGB image, the method can also include transforming the RBG image into a luminance-chrominance color space, applying the method to an illuminance component of the luminance-chrominance color space, and transforming the result to the RGB color space.

In another aspect, an apparatus for image high dynamic range compression is disclosed. The apparatus includes an application, a processor configured for executing the application, and a memory configured for temporarily storing data for execution by the processor. The application is configured for separating the image into a base image and a detail image, wherein the base image includes illumination information of the image, determining a base image histogram corresponding to the base image, wherein the base image histogram defines an illumination distribution of the base image, filtering the base image histogram according to a trimming function, thereby generating a base image trimmed histogram, calculating a base image cumulative histogram corresponding to the base image trimmed histogram, compressing the base image according to the base image cumulative histogram, thereby generating a compressed base image, and combining the compressed base image and the detailed image, thereby forming a high dynamic range compressed image.

In yet another aspect, a method of image high dynamic range compression includes separating the image into a base image and a detail image, wherein the base image includes illumination information for each pixel of the image, defining a threshold illumination intensity value, determining a partial base image histogram corresponding to the base image, wherein each pixel includes an illumination intensity value and the partial base image histogram defines an illumination distribution of the pixels in the base image with the illumination intensity value below the threshold illumination intensity value, filtering the partial base image histogram according to a trimming function, thereby generating a base image trimmed histogram, calculating a first portion of a base image cumulative histogram according to the base image trimmed histogram, defining a second portion of the base image cumulative histogram, wherein the second portion is defined by the identity function, compressing the base image according to the base image cumulative histogram, thereby generating a compressed base image, wherein the first portion of the base image cumulative histogram is applied to each pixel in the base image with the illumination intensity value less than the threshold illumination intensity value, and the second portion of the base image cumulative histogram is applied to each pixel in the base image with the illumination intensity value greater than or equal to the threshold illumination intensity value, and combining the compressed base image and the detailed image, thereby forming a high dynamic range compressed image. The method can also include determining a noise distribution of the base image. The trimming function can be defined by the noise distribution of the base image. The trimming function can attenuate the base image histogram according to a maximum number of pixels distributed at each illumination intensity value. The image can be separated using a blurring filter, such as a Gaussian filter or an edge-preserving filter such as a bilateral filter. The trimming function can be determined such that a derivative of the first portion of the base image cumulative histogram resulting from the trimming function does not exceed a predetermined value. The trimming function can define a different maximum number of pixels for each illumination intensity value. The image can be a grayscale image. If the image is a color RGB image, the method can be applied to each of the R, G, and B channels independently. If the image is a color RGB image, the method can also include transforming the RBG image into a luminance-chrominance color space, applying the method to an illuminance component of the luminance-chrominance color space, and transforming the result to the RGB color space. The threshold illumination intensity value can define a range of illumination intensity values. The base image cumulative histogram can also include a third portion corresponding to the range of illumination intensity values, wherein the third portion comprises a smoothing function configured to gradually transition from the first portion of the base image cumulative histogram to the second portion of the base image cumulative histogram.

In another aspect, an apparatus for image high dynamic range compression includes an application, a processor configured for executing the application, and a memory coupled to the processor, the memory configured for temporarily storing data for execution by the processor. The application is configured for separating the image into a base image and a detail image, wherein the base image includes illumination information for each pixel of the image, defining a threshold illumination intensity value, determining a partial base image histogram corresponding to the base image, wherein each pixel includes an illumination intensity value and the partial base image histogram defines an illumination distribution of the pixels in the base image with the illumination intensity value below the threshold illumination intensity value, filtering the partial base image histogram according to a trimming function, thereby generating a base image trimmed histogram, calculating a first portion of a base image cumulative histogram according to the base image trimmed histogram, defining a second portion of the base image cumulative histogram, wherein the second portion is defined by the identity function, compressing the base image according to the base image cumulative histogram, thereby generating a compressed base image, wherein the first portion of the base image cumulative histogram is applied to each pixel in the base image with the illumination intensity value less than the threshold illumination intensity value, and the second portion of the base image cumulative histogram is applied to each pixel in the base image with the illumination intensity value greater than or equal to the threshold illumination intensity value, and combining the compressed base image and the detailed image, thereby forming a high dynamic range compressed image.

BRIEF DESCRIPTION OF THE DRAWINGS

Embodiments of the high dynamic range compression methods are described relative to the several views of the drawings. Where appropriate and only where identical elements are disclosed and shown in more than one drawing, the same reference numeral will be used to represent such identical elements.

DETAILED DESCRIPTION OF THE EMBODIMENTS

Embodiments of the high dynamic range compression methods are directed toward reducing, or compressing, the dynamic range of an image to make it more appropriate for a specific output device, and toward limiting the amount of noise during the dynamic range compression phase. In some embodiments, the compression methods are applied as a local method in which different transformations are applied to pixels in different positions within the image. The compression methods include separating the original image into a base image and a detail image. The base image approximates the illumination in the original image. The detail image maintains the fine details from the original image. In general, the detail image includes all remaining image information of the original image after the base image information is removed. The illumination information includes in the base image defines the contrast of the original image. As such, the detail image appears flat because the depth, or contrast, of the original image is included in the base image. As most of the total contrast of the original image is included in the base image, an approach to reducing dynamic range of the original image is to reduce the contrast of the base image, and then add back the detail of the detailed image. It is desired to preserve as much of the original detail as possible during the compression process. By filtering the detail information before applying the compression algorithm, detail preservation is improved, thereby reducing loss of detail information. In this manner, the detail visibility is enhanced because the contrast is reduced while the original detail is essentially maintained.

In some embodiments, a blurring filter is used to separate the original image into the base image and the detail image. A base image histogram is generated for the base image. The base image histogram is then trimmed to form a base image trimmed histogram. The base image histogram is trimmed such that the derivative of the corresponding cumulative histogram of the base image does not exceed a certain limit, or ceiling. In some embodiments, the ceiling is adjusted to the noise distribution within the base image.

A modified cumulative histogram is then generated according to the base image trimmed histogram. This modified cumulative histogram is then applied to the base image to generate a compressed base image. The detail image and the compressed base image are then combined to generate a compressed image.

Figure 1:
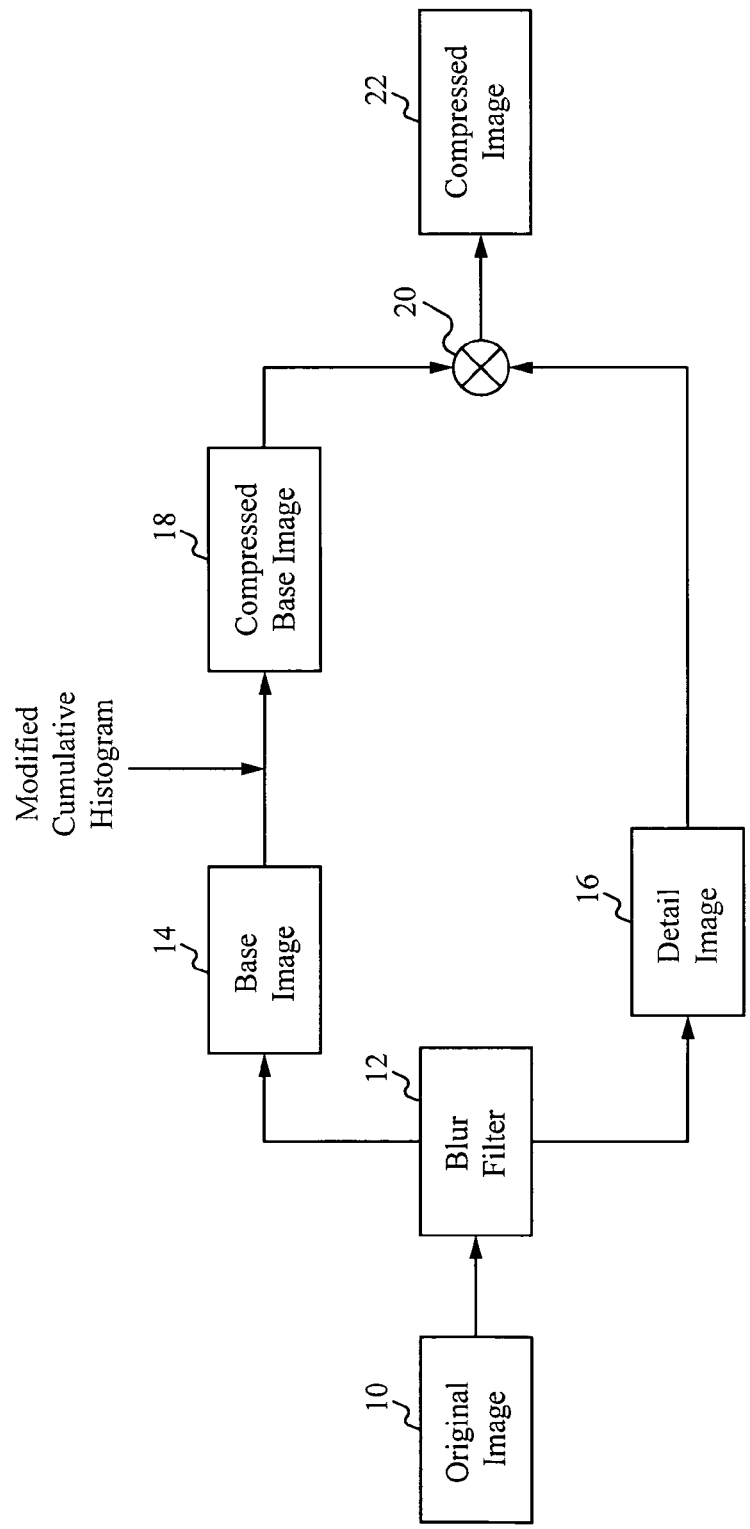
FIG. 1 illustrates an application of the compression method to an original image.

FIG. 1 illustrates an application of a first compression method to an original image 10. A blur filter 12 is applied to the original image 10, thereby generating a base image 14 and a detail image 16. In some embodiments, the blur filter 12 is a conventional Gaussian filter. In other embodiments, the blur filter 12 is a more advanced, edge-preserving filter such as a bilateral filter. The Gaussian filter has the advantage of being computationally simpler. However, the Gaussian filter filters across the edges within an image, resulting in halo artifacts within the resulting image. The edge-preserving filter has the potential to yield fewer image artifacts (halos) across the edges. The compression method can also include detecting and correcting halo artifacts present within a processed image. One such detection and correction method is described in the co-owned, co-pending U.S. patent application Ser. No. 12/004,855, entitled "Method for Automatic Detection and Correction of Halo Artifacts in Images," filed on Dec. 21, 2007, which is hereby incorporated by reference.

Figure 2:
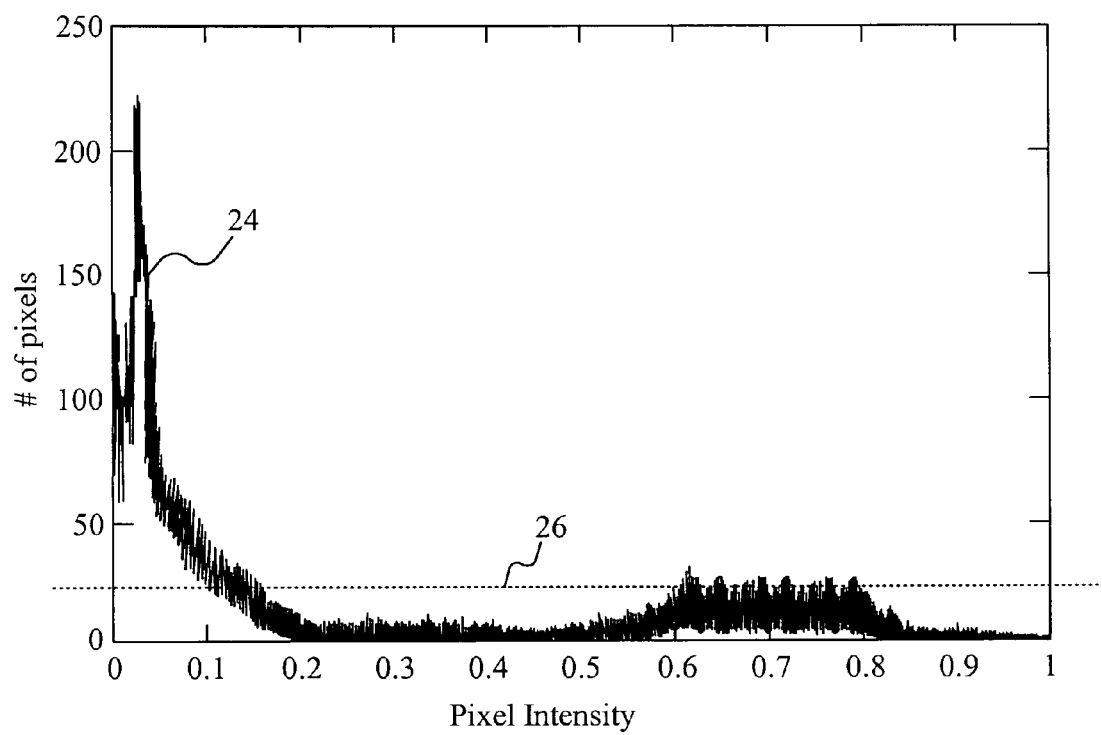
FIG. 2 illustrates an exemplary base image histogram including a first trimming function.
Figure 3:
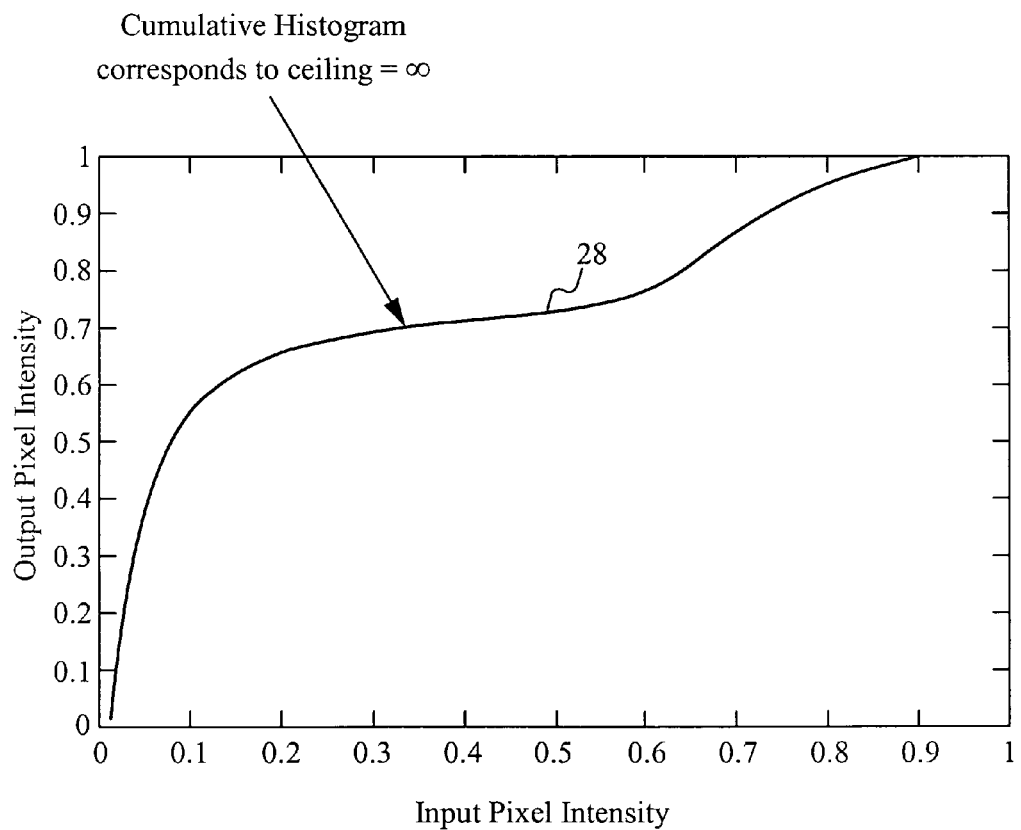
FIG. 3 illustrates a cumulative histogram corresponding to the base image histogram of FIG. 2.

A base image histogram and a corresponding cumulative histogram are then determined for the base image 14. FIG. 2 illustrates an exemplary base image histogram. Light intensity is measured along the x-axis, from darkest on the left to brightest on the right, and the number of pixels is measured in the y-axis. As shown in FIG. 2, an exemplary pixel distribution 24 includes a large number of pixels with relatively dark illumination, as measured by the spike in the left hand portion of the pixel distribution 24. FIG. 3 illustrates a cumulative histogram, including a cumulative histogram curve 28, which corresponds to the base image histogram of FIG. 2. The steepness of the left hand portion of the cumulative histogram curve 28 corresponds to the spike and the large number of relatively dark pixels defined by the pixel distribution 24 (FIG. 2). In general, the cumulative histogram curve 28 provides a pixel intensity transformation from an input intensity value (original value) to an output intensity value (transformed value) for each pixel in the original image.

Figure 4:
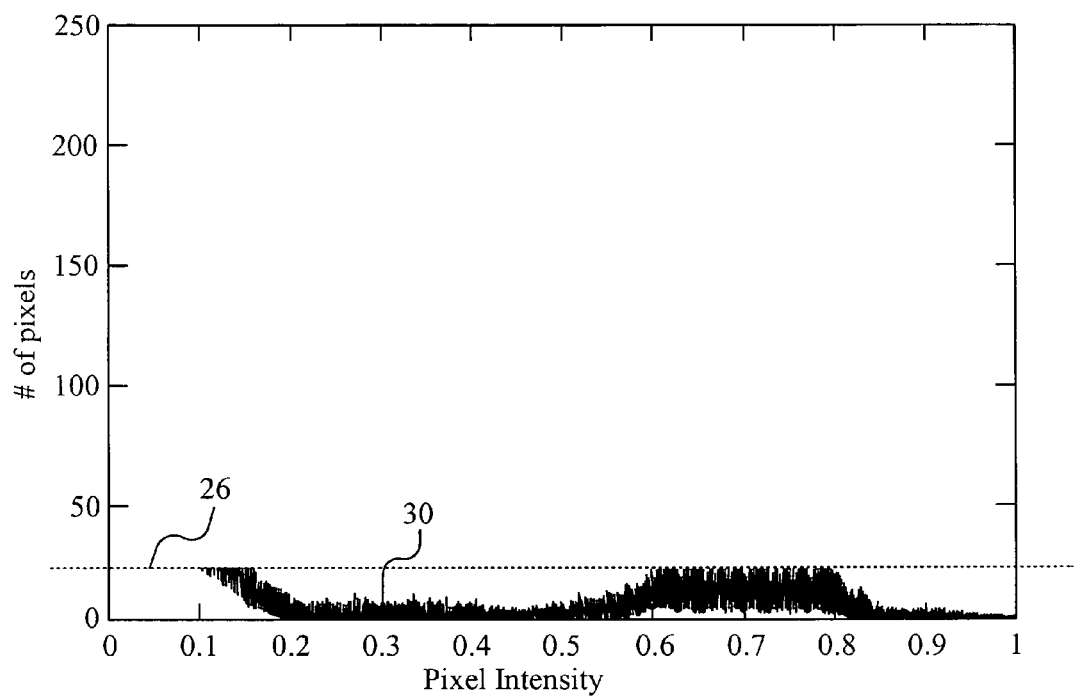
FIG. 4 illustrates a base image trimmed histogram corresponding to the application of a trimming function.

Since the base image 14 attempts to approximate the illumination in the original image 10, most of the dynamic range of the original image 10 is contained in the base image 14. Compressing the base image 14 provides an effective means for reducing the dynamic range of the original image 10. However, compressing the base image 14 with the base image cumulative histogram 28 provides a compression level that is generally too high and is equivalent to performing histogram equalization on the base image 14. Application of the base image cumulative histogram 28 typically results in a compressed image in which the contrast is excessive. Instead of using the base image cumulative histogram 28, a modified cumulative histogram is generated in order to limit the compression level. To modify the cumulative histogram, the base image histogram 24 (FIG. 2) is trimmed such that the derivative of the resulting cumulative histogram of the trimmed base image does not exceed a certain limit, or ceiling, generally referred to as a trimming function. An exemplary ceiling is illustrated in FIG. 2 as trimming function 26. In one embodiment, the ceiling is constant across all histogram bins and is calculated as the average value of histogram across all bins. FIG. 4 illustrates a base image trimmed histogram 30, which corresponds to the application of the trimming function 26 to the pixel distribution 24 (FIG. 2). The modified cumulative histogram is then calculated from the base image trimmed histogram 30, illustrated in FIG. 5 as modified cumulative histogram curve 32. Trimming the histogram 24 (FIG. 2) by the trimming function 26 (FIG. 2) limits the slope of the resulting modified cumulative histogram curve 32, since the derivative of a cumulative histogram is the histogram itself.

Figure 6:
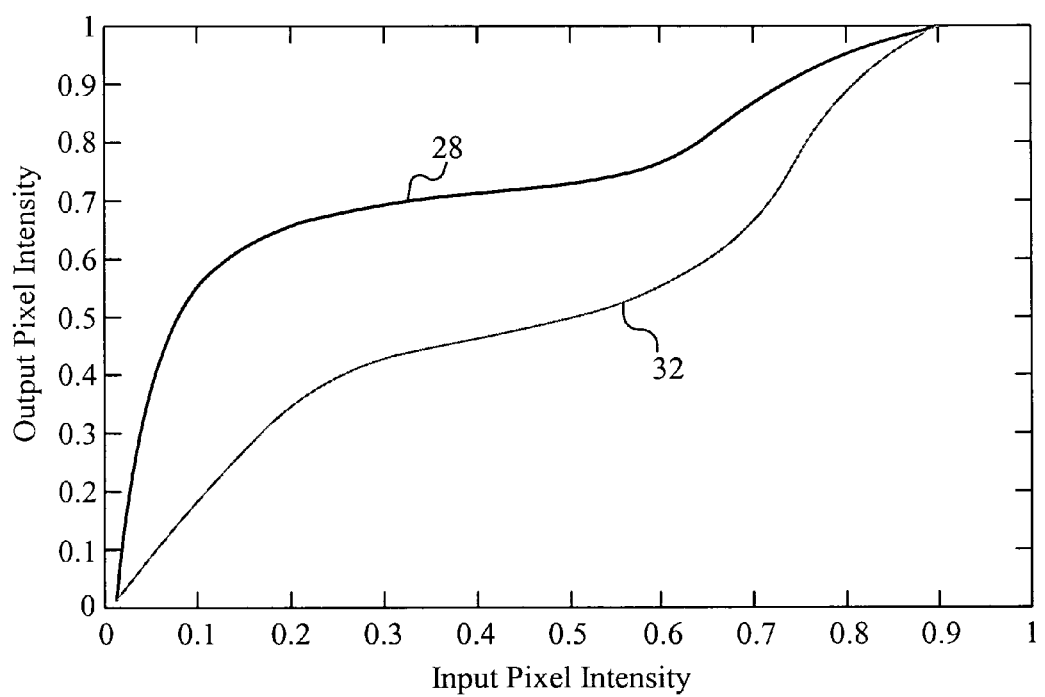
FIG. 6 illustrates a comparison of the cumulative histogram curve of FIG. 3 and the modified cumulative histogram of FIG. 5.

FIG. 6 illustrates a comparison of the cumulative histogram curve 28 and the modified cumulative histogram curve 32. The modified cumulative histogram curve 32 is relatively flatter, and therefore smoother, than the cumulative histogram curve 28. When the smoother modified cumulative histogram 32 is applied to the base image 14 (FIG. 2), the contrast in the resulting compressed base image is improved. When performing dynamic range compression on an image, the more dramatic the compression, the more uniform the brightness within the resulting image will be. As the brightness becomes more uniform, contrast is sacrificed. By smoothing the cumulating histogram curve that is applied to compress an image, the resulting compressed image includes more contrast, which is a desired result.

Figure 7:
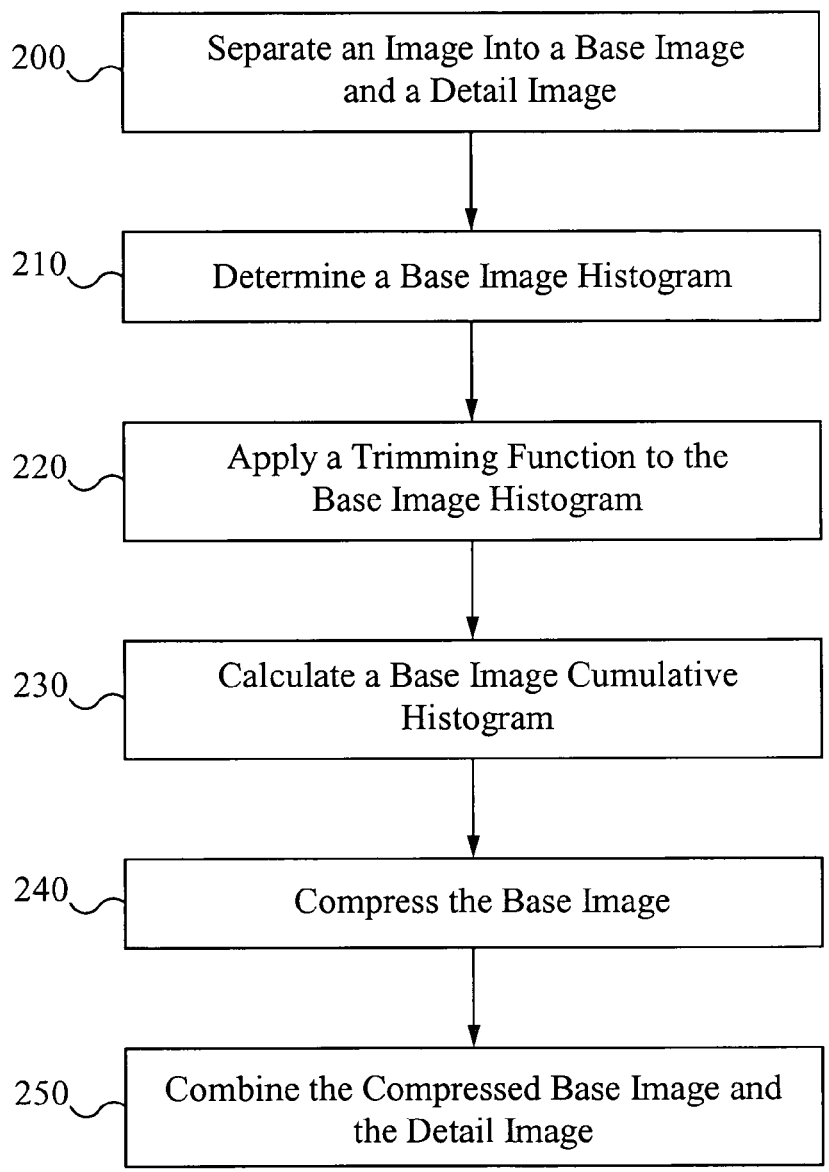
FIG. 7 illustrates an exemplary method of performing high dynamic range compression.

FIG. 7 illustrates an exemplary method of performing high dynamic range compression. At a step 200, an image is separated into a base image and a detail image. The base image includes the illumination information associated with the image. The detail image includes the fine detail of the image. At a step 210, a histogram of the base image is determined, thereby forming a base image histogram. The base image histogram defines the illumination distribution of the base image. At a step 220, a trimming function is applied to the base image histogram. The trimming function attenuates the base image histogram at each illumination according to a maximum value, thereby forming a base image trimmed histogram. The trimming function can represent any curve, such as a straight horizontal line, a tilted line, a curved line, or a variously fluctuating curve. At a step 230, a base image cumulative histogram is calculated corresponding to the base image trimmed histogram. At a step 240, the base image is compressed according to the base image cumulative histogram, thereby generating a compressed base image. The base image is compressed by applying the base image cumulative histogram to each pixel. In this manner, the illumination intensity value for each pixel is transformed according to the base image cumulative histogram. At the step 250, the compressed base image is combined with the detail image separated at the step 200, thereby forming a compressed image.

Figure 8:
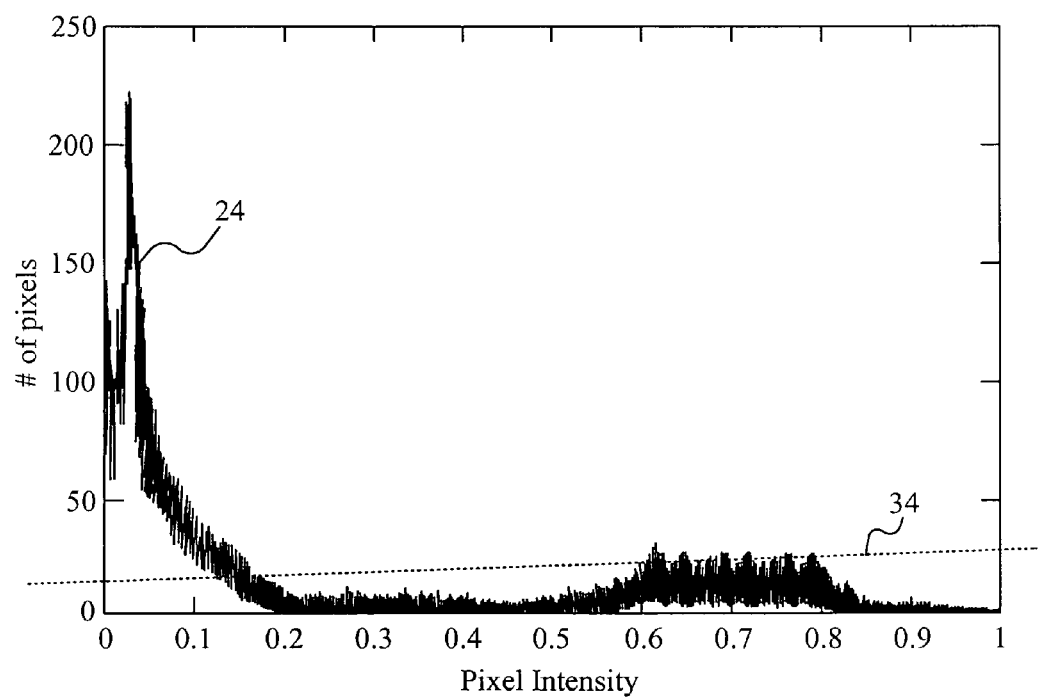
FIG. 8 illustrates the base image histogram of FIG. 2 including a second trimming function.
Figure 9:
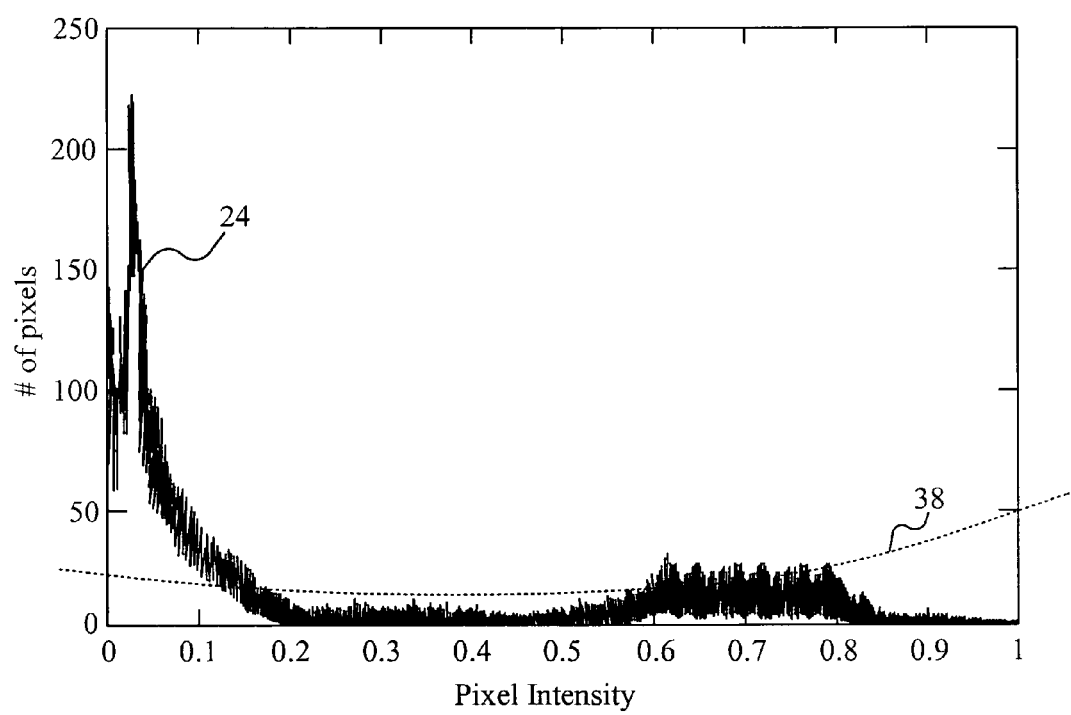
FIG. 9 illustrates the base image histogram of FIG. 2 including a third trimming function.

As shown in FIG. 2, the curve of the trimming function 26 is a horizontal line. Alternatively, the curve of the trimming function can represent any shape. For example, FIG. 8 illustrates a trimming function 34 configured as a tilted line, and FIG. 9 illustrates a trimming function 38 configured as an arc. In some embodiments, the shape and position of the trimming function are determined according to the noise distribution within the base image 14.

Referring to FIG. 1, once the modified cumulative histogram is generated, such as the modified cumulative histogram 32 (FIG. 5), the base image 14 is compressed by applying the modified cumulative histogram, thereby generating a compressed base image 18. The detail image 16 and the compressed base image 18 are combined by a mixer 20 to generate a compressed image 22.

In some applications, applying the modified cumulative histogram to all pixels in the base image results in decreased detail preservation for those pixels with relatively lighter intensity values. A second compression method applies the modified cumulative histogram of the first compression method to a shadow region of the base image, while a remaining highlight region remains substantially unchanged, thereby enhancing detail in the shadow region while preserving detail in the highlight region. A threshold value is defined that partitions the base image into the shadow region and the highlight region. All pixel intensity values less than or equal to the threshold value constitute the shadow region and all pixel intensity values above the threshold value constitute the highlight region. The shadow region includes those pixels with relatively darker intensity values, while the highlight region includes those pixels with relatively lighter intensity values. The modified cumulative histogram generated in the first compression method, subsequently referred to as the first modified cumulative histogram, is applied to those pixels with intensity values in the shadow region, while an identity function is applied to those pixels with intensity values in the highlight region. The identity function defines a one-to-one relationship between an input value and an output value. As applied to the pixels in the highlight region, there is no change in pixel intensity value as a result of applying the identity function. As such, a second modified cumulative histogram used by the second compression method includes a first portion corresponding to the shadow region and a second portion corresponding to the highlight region. The first portion is the same as the corresponding portion of the first modified cumulative histogram and functions to enhance the detail of the relatively darker pixels. The second portion is the identity function and functions to maintain the detail of the relatively lighter pixels.

In some embodiments, the threshold value defines a specific value. In other embodiments, the threshold value defines a range of values. If the threshold value is a specific value, then there may be a discontinuity between the first portion of the second modified cumulative histogram and the second portion. When a discontinuity exists, the curve on either side of the threshold value can be smoothed to eliminate the discontinuity. In this case, it is more appropriate to define the threshold value as a range of values within which the curve is modified to smooth the transition between the first portion and the second portion of the second modified cumulative histogram. In effect, there is a transition region between the shadow region and the highlight region. This transition region of the second modified cumulative histogram is referred to as a third portion of the second modified cumulative histogram. In general, the threshold value refers to the transition between the shadow region and the highlight region.

The threshold value is application-specific and is ideally set according to the histogram of a specific base image. In many applications, the threshold value is determined empirically. The threshold value is able to be predetermined or dynamically determined according to the light distribution of the image, for example the histogram of the base image.

Figure 5:
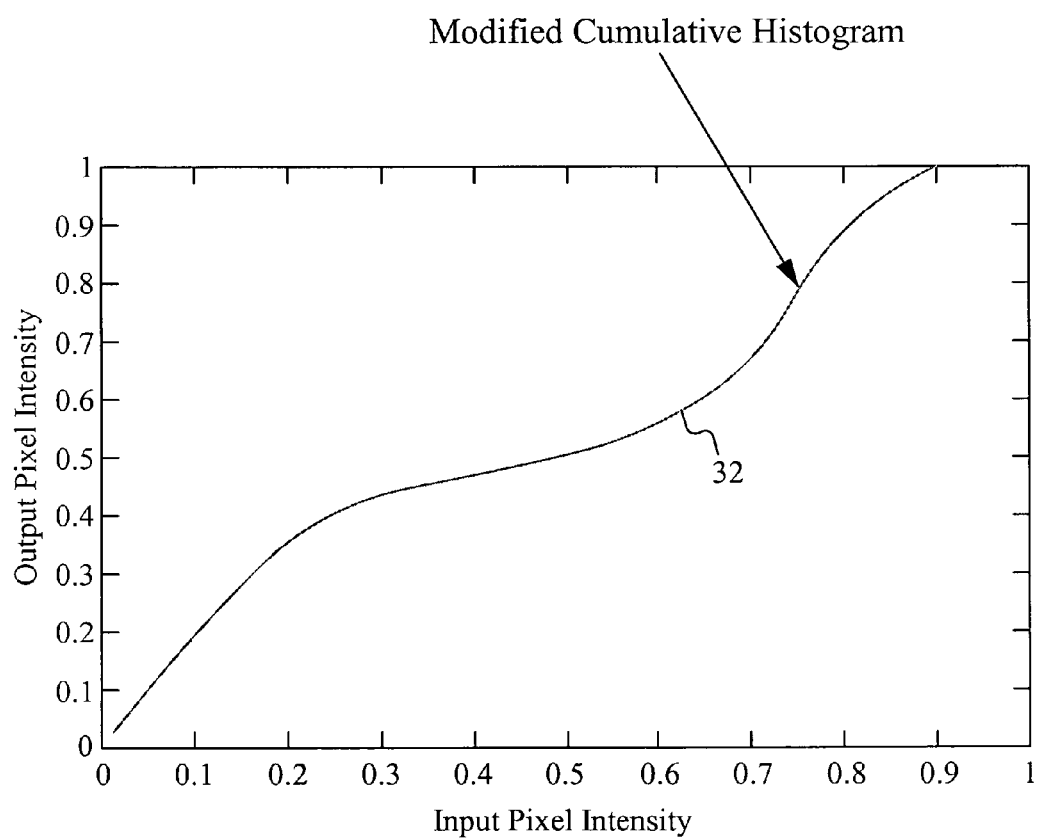
FIG. 5 illustrates a modified cumulative histogram corresponding to the base image trimmed histogram of FIG. 4.
Figure 10:
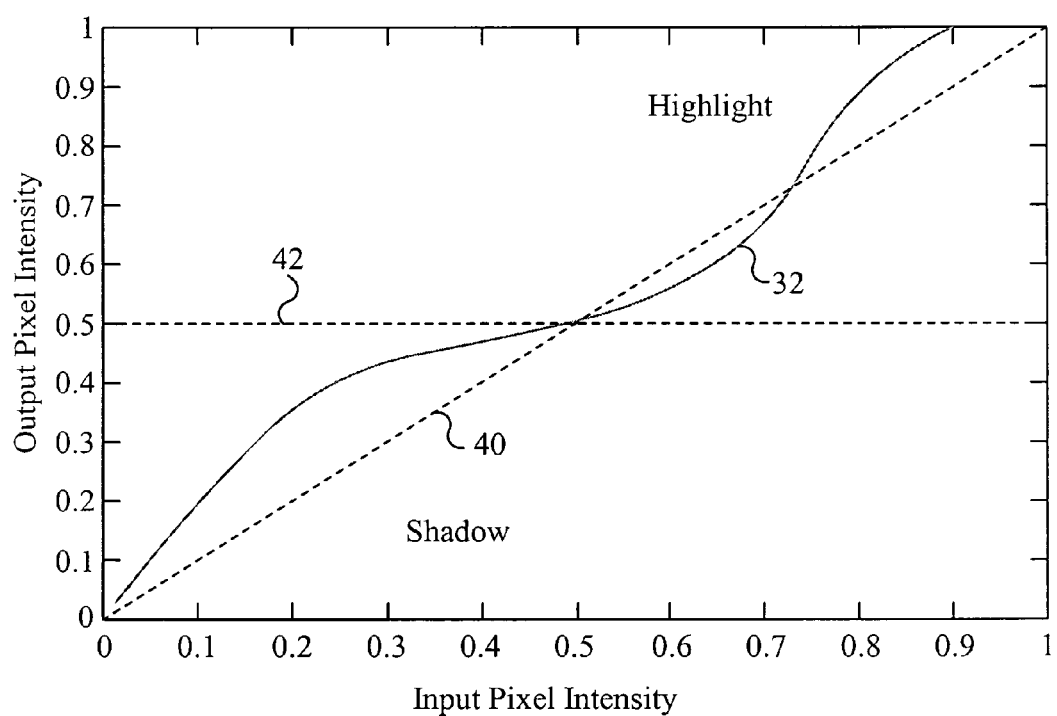
FIG. 10 illustrates exemplary components of a second modified cumulative histogram used by the second compression method.

The second compression method separates the original image into the base image and the detail image, and determines the base image trimmed histogram in the same manner as the first compression method. A threshold value is defined and a first portion of a second modified cumulative histogram is then calculated from the base image trimmed histogram, such as the base image trimmed histogram 30 (FIG. 4). The first portion corresponds to the shadow region as defined by the threshold value. The first portion is the same as the corresponding portion of the modified cumulative histogram curve 32 (FIG. 5). FIG. 10 illustrates exemplary components of the second modified cumulative histogram used by the second compression method. A threshold value 42 defines a shadow region and a highlight region. In this example, the threshold value 42 corresponds to a pixel intensity value of 0.5. Although the threshold value curve 42 is shown as a horizontal line, the threshold value curve can equally be shown as a vertical line. An identity function 40 defines a one-to-one relationship between the input pixel intensity and the output pixel intensity.

Figure 11:
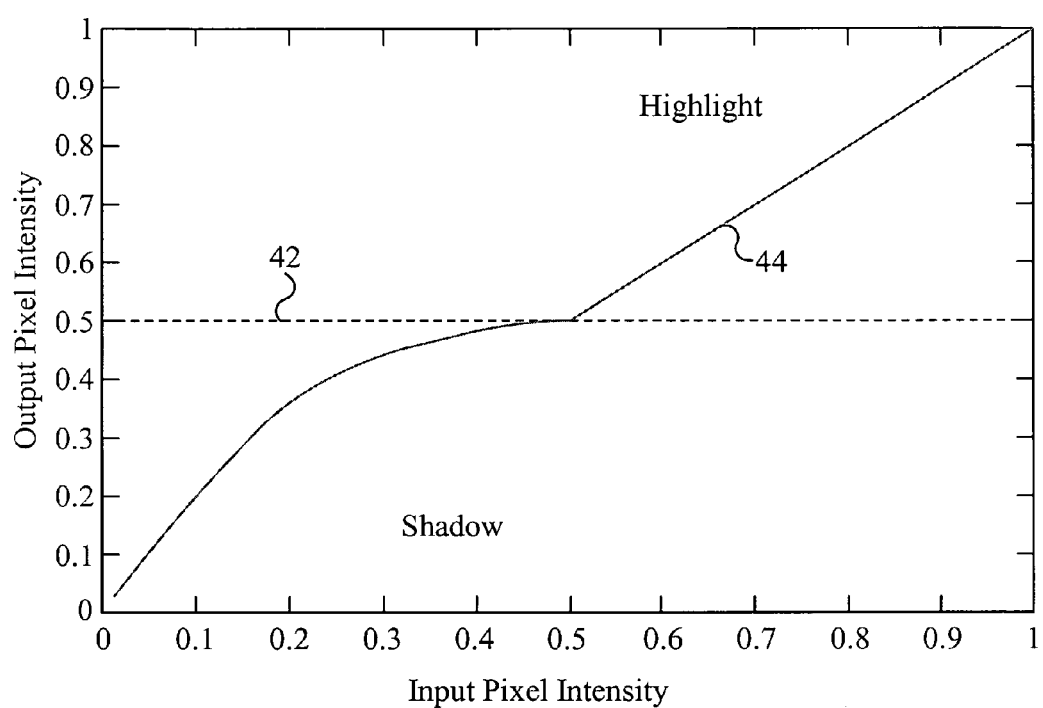
FIG. 11 illustrates the second modified cumulative histogram corresponding to the exemplary components of FIG. 10.

FIG. 11 illustrates the second modified cumulative histogram corresponding to the exemplary components of FIG. 10. The second modified cumulative histogram 44 includes a first portion in the shadow region and a second portion in the highlight region. The first portion corresponds to that portion of the first modified cumulative histogram 32 (FIG. 10) equal to or less than the threshold value 42. The second portion corresponds to that portion of the identity function 40 greater than the threshold value 42. In this example, the second modified cumulative histogram is smoothed about the threshold value such that there is a gradual transition between the first portion and the second portion. As applied by the second compression method, the second modified cumulative histogram 44 transforms an input pixel intensity value of 0.8 to an output pixel intensity value of 0.8, as defined by the second portion, and an input pixel intensity value of 0.2 to an output pixel intensity value of about 0.32, as defined by the first portion. Such a transformation enhances the detail in the shadow region and maintains the detail in the highlight region.

Figure 12:
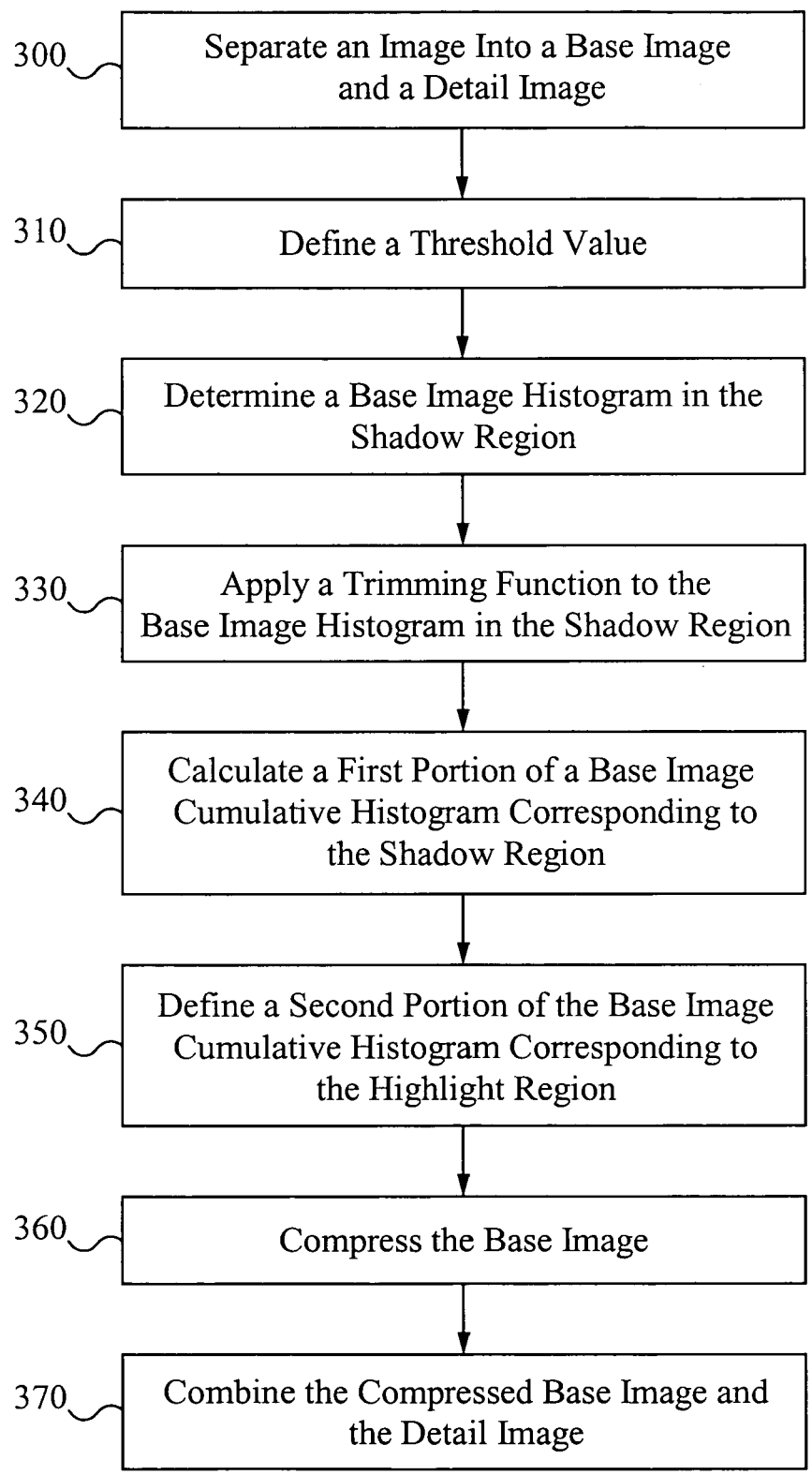
FIG. 12 illustrates another exemplary method of performing high dynamic range compression.

FIG. 12 illustrates another exemplary method of performing high dynamic range compression. At a step 300, an image is separated into a base image and a detail image. The base image includes the illumination information associated with the image. Each pixel in the base image includes an illumination intensity value. The detail image includes the fine detail of the image. At the step 310, a threshold illumination intensity value is defined. In some embodiments, the threshold illumination intensity value is empirically determined, and is a predetermined value. In other embodiments, the threshold illumination intensity value is dynamically determined according to determined characteristics of the base image and/or other characteristics external to the base image. At a step 320, a partial histogram of the base image is determined, thereby forming a partial base image histogram. The partial base image histogram defines an illumination distribution of the pixels in the base image with an illumination intensity value less than or equal to the threshold illumination intensity value, otherwise referred to as the shadow region. At a step 330, a trimming function is applied to the partial base image histogram. The trimming function attenuates the partial base image histogram at each illumination intensity according to a maximum value, thereby forming a base image trimmed histogram. The trimming function can represent any curve, such as a straight horizontal line, a tilted line, a curved line, or a variously fluctuating curve.

At a step 340, a first portion of a base image cumulative histogram is calculated corresponding to the base image trimmed histogram. The first portion of the base image cumulative histogram corresponds to the shadow region. At a step 350, a second portion of the base image cumulative histogram is defined. The second portion is defined by the identity function and corresponds to illumination intensity values greater than the threshold illumination intensity value, otherwise referred to as the highlight region. At a step 360, the base image is compressed according to the base image cumulative histogram, thereby generating a compressed base image. The first portion of the base image cumulative histogram is applied to each pixel in the shadow region, and the second portion of the base image cumulative histogram is applied to each pixel in the highlight region. In this manner, the illumination intensity value for each pixel is transformed according to the base image cumulative histogram. At the step 370, the compressed base image is combined with the detail image separated at the step 300, thereby forming a compressed image.

Figure 13:
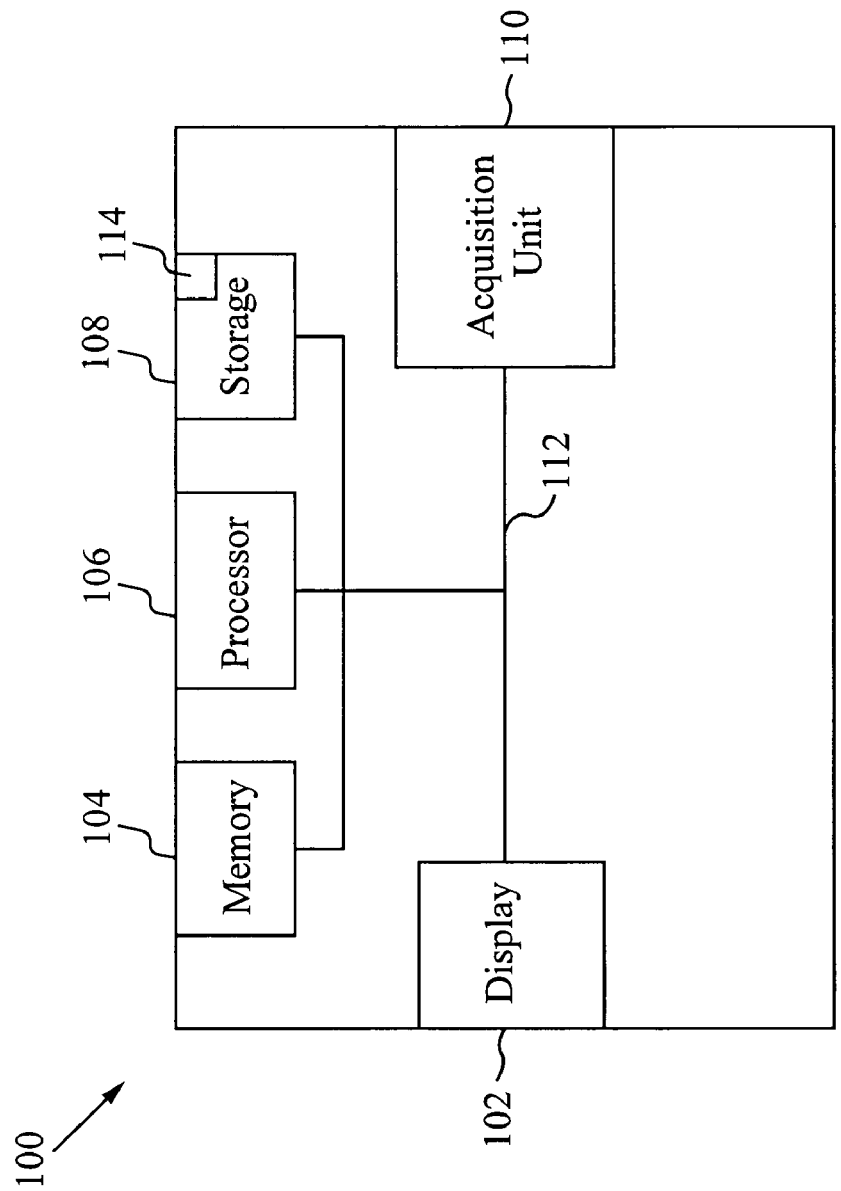
FIG. 13 illustrates a graphical representation of an exemplary computing device configured to implement the compression method of the present invention.

FIG. 13 illustrates a graphical representation of an exemplary computing device configured to implement the compression method of the present invention. A computing device 100 includes a display 102, a memory 104, a processor 106, a storage 108, an acquisition unit 110, and a bus 112 to couple the elements together. The acquisition unit 110 acquires image data which is then processed by the processor 106 and temporarily stored in the memory 104 and more permanently stored on the storage 108. The display 102 displays the image data acquired either during acquisition or when utilizing a display feature. When the compression method described herein is implemented in software, an application 114 resides on the storage 108, and the processor 106 processes the necessary data while the amount of the memory 104 used is minimized. When implemented in hardware, additional components are utilized to process the data, as described above. The computing device 100 is able to be, but is not limited to, a digital camcorder, a digital camera, a cellular phone, PDA, or computer.

The compression methods describe methods of compressing the dynamic range of a grayscale image. To apply the methods to color RGB images, at least two approaches are possible. A first approach is to apply a compression method to each of the R, G, B channels independently. The first approach has the advantage that colors are in-gamut after compression, but does not guarantee lightness preservation. A second approach transforms the RGB image into a luminance-chrominance color space such as Lab or YCC. The compression method is then applied on the luminance alone. The result is then transformed back to RGB. The second approach provides lightness preservation, but does not guarantee that colors are maintained in-gamut after dynamic range compression.

In some applications, the second compression method utilizing the threshold value provides truer saturated colors. Saturation of color is directly influenced by detail preservation. If more detail is preserved in the highlight region, the saturation in color in the highlight region is also better preserved.

The compression methods described herein provide many advantages. A first advantage is that the modified cumulative histogram is computed and applied to the base image only, as opposed to applying it as a global method to the original image. This provides for better detail preservation. A second advantage consists of adjusting the trimming function based on the noise level, and in some applications varying the ceiling for different pixel values, to better account for the noise distribution within the image.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A method of image high dynamic range compression, the method comprising:
 a. separating an image into a base image and a detail image, wherein the base image includes illumination information of the image;
 b. determining a base image histogram corresponding to the base image, wherein the base image histogram defines an illumination distribution of the base image;
 c. filtering the base image histogram according to a trimming function, thereby generating a base image trimmed histogram;
 d. calculating a base image cumulative histogram corresponding to the base image trimmed histogram, wherein the base image trimmed histogram further comprises a smoothing function configured to gradually transition from a first portion of the base image cumulative histogram to a second portion of the base image cumulative histogram;

e. compressing the base image according to the base image cumulative histogram, thereby generating a compressed base image; and f. combining the compressed base image and the detailed image, thereby forming a compressed image.

2. The method of claim 1 further comprising determining a noise distribution of the base image.

3. The method of claim 2 wherein the trimming function is defined by the noise distribution of the base image.

4. The method of claim 1 wherein the trimming function attenuates the base image histogram according to a maximum value for the pixel distribution at each illumination.

5. The method of claim 1 wherein the image is separated using a blurring filter.

6. The method of claim 5 wherein the blurring filter comprises a Gaussian filter.

7. The method of claim 5 wherein the blurring filter comprises an edge-preserving filter.

8. The method of claim 1 wherein the trimming function is determined such that a derivative of the base image cumulative histogram resulting from the trimming function does not exceed a predetermined value.

9. The method of claim 1 wherein the trimming function defines a different maximum pixel distribution for each illumination value.

10. The method of claim 1 wherein if the image is a color RGB image, the method is applied to each of the R, G, and B channels independently.

11. The method of claim 1 wherein if the image is a color RGB image, the method further comprises transforming the RBG image into a luminance-chrominance color space, applying the method to an illuminance component of the luminance-chrominance color space, and transforming the result to the RGB color space.

12. An apparatus for image high dynamic range compression, the apparatus comprising:
  a. an application for:
    i. separating an image into a base image and a detail image, wherein the base image includes illumination information of the image;
    ii. determining a base image histogram corresponding to the base image, wherein the base image histogram defines an illumination distribution of the base image;
    iii. filtering the base image histogram according to a trimming function, thereby generating a base image trimmed histogram;
    iv. calculating a base image cumulative histogram corresponding to the base image trimmed histogram, wherein the base image trimmed histogram further comprises a smoothing function configured to gradually transition from a first portion of the base image cumulative histogram to a second portion of the base image cumulative histogram;
    v. compressing the base image according to the base image cumulative histogram, thereby generating a compressed base image; and
    vi. combining the compressed base image and the detailed image, thereby forming a high dynamic range compressed image;
  b. a processor configured for executing the application; and
  c. a memory coupled to the processor, the memory configured for temporarily storing data for execution by the processor.

13. A method of image high dynamic range compression, the method comprising:
  a. separating an image into a base image and a detail image, wherein the base image includes illumination information for each pixel of the image;
  b. defining a threshold illumination intensity value, wherein the threshold illumination intensity value defines a range of illumination intensity values;
  c. determining a partial base image histogram corresponding to the base image, wherein each pixel includes an illumination intensity value and the partial base image histogram defines an illumination distribution of the pixels in the base image with the illumination intensity value below the threshold illumination intensity value;
  d. filtering the partial base image histogram according to a trimming function, thereby generating a base image trimmed histogram;
  e. calculating a first portion of a base image cumulative histogram according to the base image trimmed histogram;
  f. defining a second portion of the base image cumulative histogram, wherein the second portion is defined by the identity function;
  g. compressing the base image according to the base image cumulative histogram, thereby generating a compressed base image, wherein the first portion of the base image cumulative histogram is applied to each pixel in the base image with the illumination intensity value less than the threshold illumination intensity value, and the second portion of the base image cumulative histogram is applied to each pixel in the base image with the illumination intensity value greater than or equal to the threshold illumination intensity value, wherein the base image cumulative histogram further comprises a third portion corresponding to the range of illumination intensity values, wherein the third portion comprises a smoothing function configured to gradually transition from the first portion of the base image cumulative histogram to the second portion of the base image cumulative histogram; and
  h. combining the compressed base image and the detailed image, thereby forming a high dynamic range compressed image.

14. The method of claim 13 further comprising determining a noise distribution of the base image.

15. The method of claim 14 wherein the trimming function is defined by the noise distribution of the base image.

16. The method of claim 15 wherein the trimming function attenuates the base image histogram according to a maximum number of pixels distributed at each illumination intensity value.

17. The method of claim 15 wherein the image is separated using a blurring filter.

18. The method of claim 17 wherein the blurring filter comprises a Gaussian filter.

19. The method of claim 17 wherein the blurring filter comprises an edge-preserving filter.

20. The method of claim 13 wherein the trimming function is determined such that a derivative of the first portion of the base image cumulative histogram resulting from the trimming function does not exceed a predetermined value.

21. The method of claim 13 wherein if the image is a color RGB image, the method is applied to each of the R, G, and B channels independently.

22. The method of claim 13 wherein if the image is a color RGB image, the method further comprises transforming the RBG image into a luminance-chrominance color space, applying the method to an illuminance component of the luminance-chrominance color space, and transforming the result to the RGB color space.

23. An apparatus for image high dynamic range compression, the apparatus comprising:
   a. an application for:
      i. separating an image into a base image and a detail image, wherein the base image includes illumination information for each pixel of the image;
      ii. defining a threshold illumination intensity value, wherein the threshold illumination intensity value defines a range of illumination intensity values;
      iii. determining a partial base image histogram corresponding to the base image, wherein each pixel includes an illumination intensity value and the partial base image histogram defines an illumination distribution of the pixels in the base image with the illumination intensity value below the threshold illumination intensity value;
      iv. filtering the partial base image histogram according to a trimming function, thereby generating a base image trimmed histogram;
      v. calculating a first portion of a base image cumulative histogram according to the base image trimmed histogram;
      vi. defining a second portion of the base image cumulative histogram, wherein the second portion is defined by the identity function;
      vii. compressing the base image according to the base image cumulative histogram, thereby generating a compressed base image, wherein the first portion of the base image cumulative histogram is applied to each pixel in the base image with the illumination intensity value less than the threshold illumination intensity value, and the second portion of the base image cumulative histogram is applied to each pixel in the base image with the illumination intensity value greater than or equal to the threshold illumination intensity value, wherein the base image cumulative histogram further comprises a third portion corresponding to the range of illumination intensity values, wherein the third portion comprises a smoothing function configured to gradually transition from the first portion of the base image cumulative histogram to the second portion of the base image cumulative histogram; and
      viii. combining the compressed base image and the detailed image, thereby forming a high dynamic range compressed image;
   b. a processor configured for executing the application; and
   c. a memory coupled to the processor, the memory configured for temporarily storing data for execution by the processor.

* * * * *